May 7, 1968     F. W. R. STARP     3,381,598

AUTOMATIC PHOTOGRAPHIC SHUTTER

Filed Sept. 30, 1965     3 Sheets-Sheet 1

INVENTOR.
Franz W. R. Starp
BY
Arthur A. March
ATTORNEY

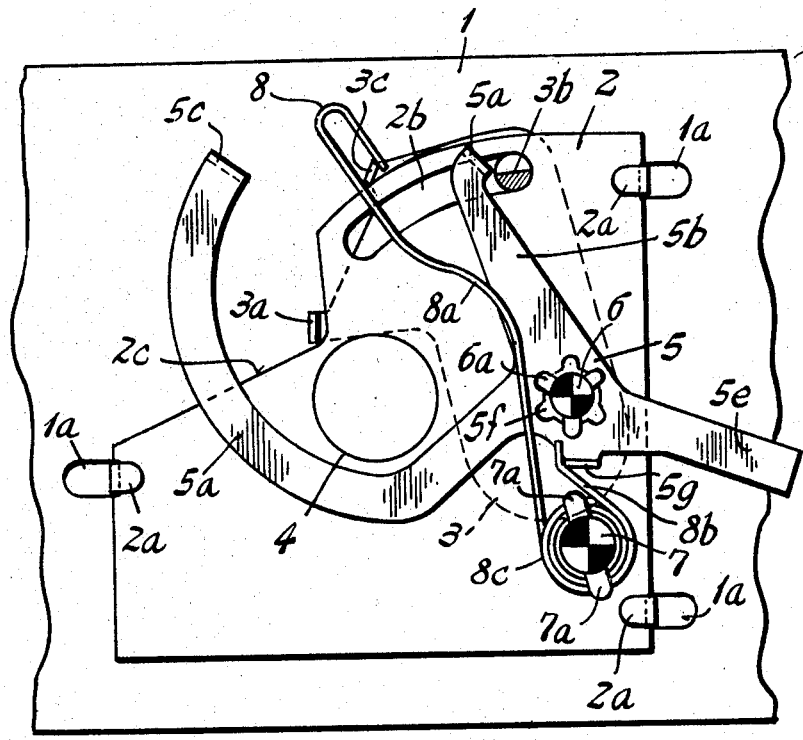

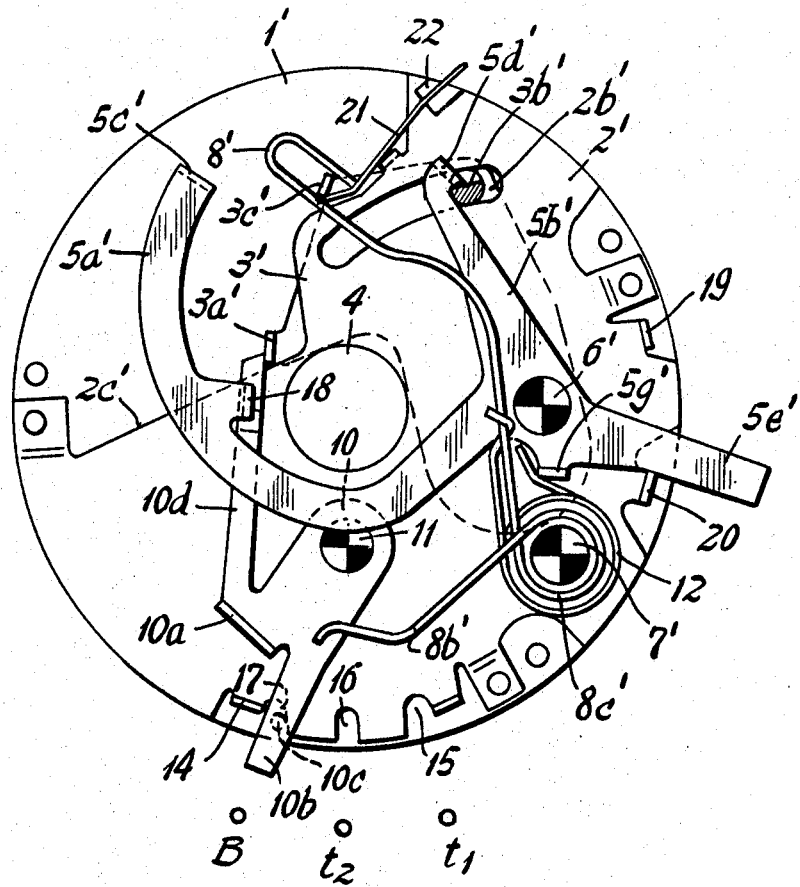

United States Patent Office 3,381,598
Patented May 7, 1968

3,381,598
AUTOMATIC PHOTOGRAPHIC SHUTTER
Franz W. R. Starp, Calmbach, Germany, assignor to Proctor-Werk Alfred Gauthier, G.m.b.H., Calmbach, Black Forest, Germany, a corporation of Germany
Filed Sept. 30, 1965, Ser. No. 491,723
Claims priority, application Germany, Oct. 3, 1964, G 41,693
8 Claims. (Cl. 95—59)

ABSTRACT OF THE DISCLOSURE

An automatic photographic shutter that has a single shutter blade and a driving mechanism associated with the blade for operating the same. A cocking and release lever and a driving spring are provided in addition to a plurality of projecting portions on the shutter blade. A guide engages one of the projecting portions to limit the movement thereof and a supporting edge engages another of the projecting portions to provide a support for the movement thereof. The projecting portions engage sections of the lever to be moved thereby from a rest position through a cocked position to release position in which the projection portions become separated from the lever to permit the blade to swing from a closed position to an open position and back to a closed position as the projecting portions follow the guide and the edge.

---

This invention relates to an automatic photographic shutter having only a single, spring-driven shutter blade actuated by a manually operable driving mechanism, which automatically releases the blade for opening and closing motion after the blade has been moved into its cocked position.

Shutters of the foregoing type having relatively few structural members, and which therefore may be considered simple as far as their construction is concerned, have been known heretofore. However, such shutters have always had the inherent disadvantage that they require both a cocking and release lever and an additional lever that acts on the shutter blade, as well as a restoring spring for each of the actuating members.

One of the main objects of the present invention is to improve such shutter arrangements by creating an automatic shutter that has an absolute minimum number of structural members while still operating dependably.

In order to achieve this object, the present invention provides a driving mechanism formed solely of a cocking and release lever and a driving spring, and the cocking and release lever has lugs that cooperate with drivers, or driving members, arranged on the shutter blade, one of the drivers being positively guided in a slot while the other driver is freely moveably supported on a supporting edge. By means of this arrangement it is possible to create a dependable shutter of extremely simple construction requiring only three movable structural elements: a shutter blade, a cocking and release lever, and a driving spring. In addition to driving the shutter, the driving spring also causes the return of the cocking and release lever, and the lens aperture is covered during the cocking process by the special positioning and guiding of the shutter blade without necessity of providing additional means.

In order to increase the dependability of the mechanism, the invention further provides that the cocking and release lever have a forked end, the two arms of which are guided laterally past the lens aperture. Each of the arms has a lug bent over at its end, and both lugs are bent to the same side.

A further feature of the invention is that the driving spring is in the form of a coil spring located on a fixed pivot pin, and the spring is so arranged, with respect to the pivot pin that serves to position the cocking and releasing lever, that the driving spring is put under increased tension when the cocking and release lever is actuated. In addition, it is further proposed that the cocking and release lever be so positioned with respect to the slot that guides the shutter blade that the lugs on the lever follow paths, during the cocking process of the driving mechanism, different from those of the drivers provided on the shutter blade. As a result the drivers are automatically released successively by the lugs at the end of the cocking motion of the driving mechanism in order to permit the shutter blade to swing to the open position without the necessity of providing additional means.

Still another feature of the invention makes is possible, in automatic shutters having only a single exposure time, for the driving spring to be directly supported at one end by the shutter blade and at the other end by the cocking and release lever.

In order to increase the flexibility of operation of the shutter arrangement according to the invention without appreciably increasing the cost of the structure, and particularly in order to make B exposures in addition to instantaneous exposures having two different exposure times, or shutter speeds, the invention further contemplates a co-axial coil spring associated with the driving spring and having one end abutting against one side of the driving spring that faces the shutter blade and the other end abutting the cocking and release lever. In addition, an adjusting lever having variable setting positions is provided to serve as an abutment for the freely movable end of the driving spring. The locking of the driving mechanism, which is necessary in order to make B exposures, can be obtained very simply by providing the adjusting lever with an elastic arm that can be moved by the cocking and release lever into the path of motion of the driver of the shutter blade.

The invention will be described in greater detail in connection with the following drawings which illustrate two embodiments of the invention and in which:

FIG. 3 shows the cocking and release lever at a later time during the operation when the lever has released the shutter blade and the latter has reached the open position;

Figure 1:
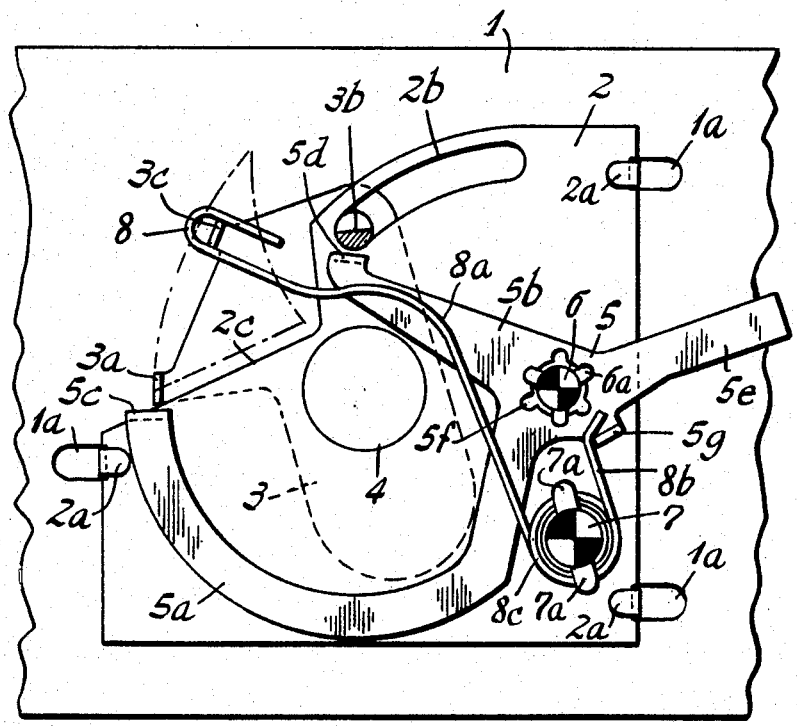
FIG. 1 is a top view of the simplest embodiment of an automatic, or self-cocking shutter, which shows the cocking and release lever in its starting position.
Figure 2:
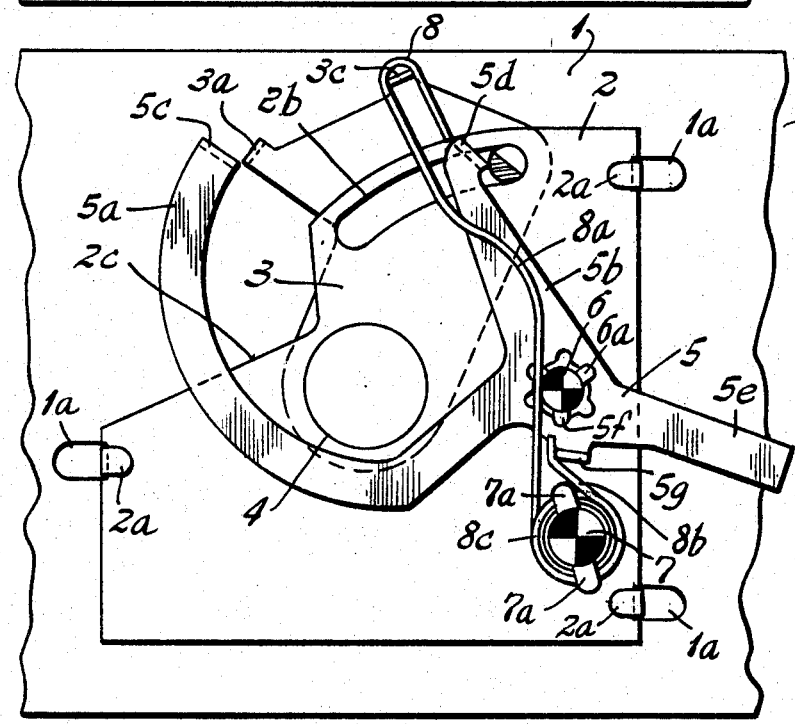
FIG. 2 shows the shutter of FIG. 1 at the end of the cocking motion during cocking and release process and with the shutter blade continuing to cover the lens aperture.

FIG. 4 shows a modified embodiment of the invention capable of being set at different exposure times and comprising a shutter blade system similar to that shown in FIGS. 1 to 3 and having a cocking and release lever shown in the starting position with the shutter set for the shorter exposure time; and FIG. 5 shows the shutter of FIG. 4 in the setting position corresponding to B exposures with the cocking and release lever moved so that the shutter blade is clear of the lens aperture.

The embodiment of the shutter shown in FIGS. 1 to 3 includes a cover plate 1, which may be formed, if desired, as part of the front wall of the camera housing. On the inside of the cover plate is a base plate 2 that carries the movable members of the shutter. Both the cover plate and the base plate may be made of plastic so as to keep the production cost low. Clamping projections 1a and 2a may be formed during the molding process and so located that they can be brought into engagement when mounting the base plate 2. The projections 1a and 2a are preferably formed to leave a gap between the cover plate 1 and the base plate 2 within which an L-shaped shutter blade 3 is free to move. Both the cover plate 1 and the base plate 2 are provided with a lens aperture 4, which is closed by the shutter blade 2 when the latter is in its starting position.

The base plate 2 has an arcuate slot 2b and a straight-sliding and supporting edge 2c extending in approximately the same direction as the slot 2b. The slot 2b and the edge 2c are provided for the purpose of positioning and guiding the shutter blade 3, which has a driver in the form of a pivot pin 3b extending into the slot 2b and a laterally bent-off driver or driving member 3a that engages the edge 2c.

A cocking and release lever 5 is provided for actuating the shutter blade 3, which is both rotated in the slot 2b and displaceably guided therealong. The lever 5 may be fork-shaped, as illustrated in the drawing, and may be rotatably mounted on a pivot pin 6 molded to the base plate 2. The lever 5 has arms 5a and 5b which are guided on both sides of the lens aperture 4 and which have, at their ends, bent-off lugs 5c and 5d that cooperate with the driving lug 3a and with the pivot pin 3b. An arm 5e on the lever 5 absorbs the compressive force, with which the shutter is cocked and released. For this purpose, the arm 5e may be operatively connected to a camera release member not shown in the drawing.

In order to simplify the mounting of the cocking and release lever 5, which may be made of plastic like the base plate 2, a plurality of radial projections 6a may be formed on the bearing pin 6, and the lever 5 may be provided with a journal having corresponding radial recesses 5f to allow the parts to be assembled like a bayonet socket and to be rotatably movable after assembly. A driving spring 8 is provided to store, during the cocking process, the necessary cocking moment to actuate the shutter blade 3. This spring is in the form of a coil spring having one end 8a which engages a lug 3c on the shutter blade, and another end 8b which bears against the bent-off lug 5g on the cocking and release lever 5. In order to position the coil section 8c of the spring 8 on the pin 7, two oppositely located, radial projecting lugs 7a may be provided on the pin 7. Furthermore the driving spring may be so formed that the coil 8c can be moved, during the mounting of the relaxed spring, over and past the radial projections 7a but, after the ends of the spring have been engaged with the respective members listed hereinabove, and the resulting tension has been placed in the spring, the diameter of the coil 8c is reduced so much that it is unable to slip over the projections 7a and thus slide off the pivot pin 7.

The driving lugs 3a and 3c on the shutter blade may be in the form of laterally bent-off lugs, but the pivot pin 3b preferably has a circular cross-section for the portion within the slot 2b and a semi-circular cross-section at its outer end to engage with the lug 5d.

The method of operation of the foregoing embodiment is as follows:

When the camera release member is actuated, the cocking and release lever 5 rotates clock-wise about the bearing pin 6. This rotary motion causes the lugs 5c and 5d to engage the driving lug 3a and the pivot pin 3b, respectively, thereby moving the shutter blade 3 from the position of FIG. 1 into an intermediate position shown in FIG. 2 while simultaneously increasing the tension of the driving spring 8. The shutter blade 3 continues to cover the lens aperture during this movement, and at the end of the movement, the driving lug 3a automatically becomes disengaged from the lug 5c because of the fact that the driving member moves along a slightly different path from that followed by the lug 5c. As a result, the shutter blade 3 is first rotated counter-clockwise about the pivot pin 3b because of the force of the driving spring 8, thus uncovering lens aperture 4. Thus rotary motion is completed as soon as the driving member 3a strikes the edge 2c, and at the some time the semi-circular portion of the pivot pin 3b rotates to a relative position with respect to the lug 5d such that the pin is able to slide past the lug, as shown in FIG. 3. The spring 8 is still under considerable tension, but the entire shutter blade 3 is now free to be moved rapidly to the left by the spring. During this motion, the driving member 3a moves along the sliding and supporting edge 2c, and the pivot pin 3b moves in the slot 2b until the pin reaches the other end of the slot, which places the shutter blade 3 directly across the aperture 4 and in the same position shown in FIG. 1. During the complete process of uncovering the aperture 4 and covering it again, the driving member 3a describes the more or less triangular path of motion indicated by the dot and dash lines in FIG. 1.

FIGS. 4 and 5 show another embodiment of the invention and similar parts will be given similar reference numerals with the addition of an apostrophe. Thus, in FIGS. 4 and 5 there is a cover plate 1' and a base plate 2' thereon. This embodiment also includes a shutter blade 3', a lens aperture 4', a cocking and release lever 5', bearing pins 6' and 7', and a driving spring 8'. Both the cover plate 1' and the base plate 2' need not be circular; they may be formed of plastic plates with straight sides, as are the corresponding members of the embodiment shown in FIGS. 1 to 3.

While the shutter arrangement of FIGS. 1 to 3 merely permits exposures to be made with a constant shutter speed, the arrangement in FIG. 5 is capable of carrying out B exposures in addition to exposure times $t_1$ and $t_2$. In order to accomplish this, one end of the driving spring 8' does not abut directly against the cocking and release lever 5' but against an adjusting lever 10 designed to serve as a support for the free end of the spring. This lever, which is the equivalent of a shutter speed, or exposure time, setting member is rotatably mounted on a fixed pivot pin 11 molded to the base plate 2' and is provided with a laterally bent-off supporting lug 10a. This lug can be moved into or out of the range of motion of the free side end 8b' of the driving spring 8', as may be seen in FIGS. 4 and 5.

In addition to the adjusting lever 10, which is provided with a handle, or finger piece, 10b, a weaker coil spring 12 is also associated with the driving spring 8'. One end of the spring 12 engages the end 8a' of the driving spring 8' which is operatively connected to the shutter blade 3' and the other end of the spring 12 engages a stop 5g' on the lever 5'. In order to be sure that the adjusting lever stays in the position to which it has set, the base plate 2' is provided not only with limiting stops 13 and 14 but also with detent notches 15, 16, and 17, and the handle 10b is provided with a cam-like projection 10c that arrests the adjusting lever by engaging one of the notches 15 or 16 or 17.

In order to permit the shutter to make B exposures, the adjusting lever 10 has an elastic arm 10d that cooperates with a stop 18, which acts as a pressure pad and is arranged on the cocking and release lever 5'. This stop presses the elastic arm 10d into the path of motion of the driving member 3a' on the shutter blade 3' when B exposures are to be made, as shown in FIG. 5.

Two end stops 19 and 20 are provided for the purpose of limiting the range of motion of the lever 5'. Just as in the embodiment shown in FIGS. 1–3, the lever 5' can be operatively connected to a shutter actuating trigger to be controlled thereby.

Since the structure and method of operation of the embodiment shown in FIGS. 4 and 5 coincides with that shown in FIGS. 1–3, the operation is basically the same, and only the setting for different shutter speeds or exposure times will be made. For example, if a photograph is to be made at the highest shutter speed, or the shutter exposure time, $t_1$, the adjusting lever 10 must be placed in the setting position shown in FIG. 4, in which position a cam, or detent, 10c on the handle 10b engages the notch 15, and the free end 8b' of the driving spring 8' rests against the supporting lug 10a of the adjusting lever. If the cocking and release lever 5' is actuated under these conditions, the shutter blade 3' is moved into a new intermediate position, as has already been explained, whereby both the force of the driving spring 8' and the force of the additional coil spring 12 have been increased. If the shutter blade 3' is released at the end of the cocking motion, the blade will move, as described in connection with FIGS. 1–3, into its open and second closed position with a driving force that is made up of the forces of the springs 8' and 12.

If the embodiment of FIGS. 4 and 5 is to be used for making exposures at a lower shutter speed, as indicated by the exposure time $t_2$, the handle 10b must be set opposite the notch 16. In this setting, the free end 8b of the driving spring no longer presses against the support lug 10a, and therefore the only force that acts upon the shutter blade is that of the coil spring 12, when it has been cocked.

If B exposures are to be made, the adjusting lever 10 must be moved to engage the notch 17, which is the position indicated in FIG. 5. In this position, only the coil spring 12 operates when the cocking and release lever 5' is actuated, since, as in the case of the exposure at time $t_2$, the free end 8b' of the driving spring 8 is not supported by the lug 10. In this position of the adjusting lever 10, the arm 10d, which is capable of yielding elastically, occupies a position with respect to the motion of the stop 18 on the lever 5' such that, when the lever 5' is subsequently actuated, the stop 18 moves the arm 10d into the path of motion of the drive 3a' of the shutter blade 3' during the final phase of the cocking motion. The arm 10d thus prevents the shutter blade 3' which is shown in its open position in FIG. 5, from returning to the closed position until the cocking and release lever 5' is released, thereby releasing the driver 3a', where upon the shutter blade 3' drops back into the starting position.

In case flash exposures are to be made with the shutter shown in FIGS. 4 and 5, a flash contact is formed of a contact spring 21 and an insulating member 22. This flash contact may be actuated by the driver 3c', which is controlled by one end 8a' of the driving spring 8', as shown in FIG. 5.

What is claimed is:

1. An automatic photographic shutter comprising a single shutter blade; a driving mechanism associated with said blade to operate the same and comprising: a cocking and release lever and a driving spring; a plurality of projecting portions on said shutter blade; a guide engaging one of said projecting portions to limit the movement thereof; and a supporting edge engaging another of said projecting portions to provide a support during the movement thereof, said projecting portions engaging sections of said lever to be moved thereby from a rest position through a cocked position to a release position in which said projecting portions become separated from said lever to permit said blade to swing from a closed position to an open position and back to a closed position as said projecting portions follow said guide and said edge.

2. An automatic shutter comprising: a lens aperture; a single spring operated shutter blade; a manually operable driving mechanism comprising a cocking and release lever having lugs thereon and a driving spring; a plurality of projecting portions on said shutter blade; a positive guide for a first one of said projecting portions and a supporting edge to be engaged by a second one of said projecting portions, said projecting portions engaging two of said lugs to be moved by said lever, said supporting edge cooperating with said guide in controlling the motion of said shutter blade from a closed position to an open position and back to a closed position after said lever has been moved to an actuation position.

3. An automatic shutter according to claim 2 in which said lever is fork-shaped and has two arms, said shutter comprising, in addition: a second guide to guide said arms laterally past said lens aperture, each of said arms having one of said lugs at the end thereof.

4. An automatic shutter according to claim 3 in which said driving spring is in the form of a coil spring, said shutter comprising, in addition: a first fixed pivot pin; a second fixed pivot pin, said lever being mounted on said first pivot pin and said spring being mounted on said second pivot pin, said pivot pins being located with respect to each other so that said driving spring is placed under increased tension when said lever is actuated.

5. An automatic shutter according to claim 4 in which said guide for said first driver is curved and said first and second lugs follow paths, when said lever is rotated on said first pivot pin, such that said drivers shift away from said lugs as said drivers reach the cocked position of said shutter blade.

6. An automatic shutter according to claim 5 in which one end of said driving spring bears against said shutter blade and the other end of said driving spring bears against said lever.

7. An automatic shutter according to claim 4 comprising, in addition: a second coil spring coaxial with said driving spring, one end of said second coil spring engaging said cocking and release lever and the other end of said second coil spring engaging one end of said driving spring, said one end of said driving spring engaging said shutter blade; an adjusting lever having a variable setting position and serving as an abutment for the other end of said driving spring.

8. An automatic shutter according to claim 7 in which: said adjusting lever comprises an elastic arm movable into the path of motion of one of said drivers, said cocking and release lever controlling the position of said elastic arm with respect to said driver.

References Cited

UNITED STATES PATENTS 2,446,265  8/1948  Crumrine _____ 95—59
3,081,683  3/1963  Horton _____ 95—59

JOHN M. HORAN, *Primary Examiner.*